(12) United States Patent
De Ruiter et al.

(10) Patent No.: US 8,131,642 B2
(45) Date of Patent: Mar. 6, 2012

(54) CONTROLLING THE VALUE OF A PLURALITY OF TRANSACTIONS INVOLVING PAYMENT TOKEN

(76) Inventors: Evert Schouten De Ruiter, Johannesburg (ZA); Albertus Jacobus Pretorius, Pretoria (ZA)

( * ) Notice: Subject to any disclaimer, the term of this patent is extended or adjusted under 35 U.S.C. 154(b) by 501 days.

(21) Appl. No.: 12/084,046

(22) PCT Filed: Oct. 27, 2006

(86) PCT No.: PCT/IB2006/053965
§ 371 (c)(1),
(2), (4) Date: Feb. 17, 2009

(87) PCT Pub. No.: WO2007/049241

PCT Pub. Date: May 3, 2007

(65) Prior Publication Data
US 2009/0198614 A1    Aug. 6, 2009

(30) Foreign Application Priority Data

Oct. 28, 2005   (ZA) .................................. 2005/08762

(51) Int. Cl.
*G06Q 40/00*   (2006.01)
(52) U.S. Cl. .......................................... 705/41; 705/35
(58) Field of Classification Search .................... 705/41, 705/35
See application file for complete search history.

(56) References Cited

U.S. PATENT DOCUMENTS
7,676,431 B2 *   3/2010   O'Leary et al. ................ 705/39

FOREIGN PATENT DOCUMENTS
| WO | 01/50305 | 7/2001 |
| WO | 02/069290 | 9/2002 |
| WO | 2004/095228 | 11/2004 |

OTHER PUBLICATIONS

International Search Report for PCT/IB2006/053965 dated Mar. 23, 2007.
International Preliminary Report on Patentability for PCT/IB2006/053965 dated Jan. 18, 2008.

\* cited by examiner

*Primary Examiner* — Thu Thao Havan
(74) *Attorney, Agent, or Firm* — Nixon & Vanderhye PC

(57) ABSTRACT

A method of controlling the value of at least one on-line transaction involving a token associated with an authorized user comprises the steps of: prior to the at least one proposed transaction, receiving at a pre-transaction authorization station, pre-transaction authorization data. The authorization data comprises first time data relating to a time window within which the at least one proposed transaction must take place and first amount data relating to an amount with which a value of the at least one proposed transaction must comply. Substantially at the time of a proposed transaction, transaction data comprising second time data relating to a time instant of the proposed transaction and second amount data relating to a value of the proposed transaction is received at the authorization station. The authentication data and transaction data are compared in real time at 34 and only if the transaction data complies with the authorization data, is the transaction enabled.

11 Claims, 3 Drawing Sheets

CONTROLLING THE VALUE OF A PLURALITY OF TRANSACTIONS INVOLVING PAYMENT TOKEN

This application is the U.S. national phase of International Application No. PCT/IB2006/053965 filed 27 Oct. 2006 which designated the U.S. and claims priority to South African Application No. 2005/08762 filed 28 Oct. 2005, the entire contents of each of which are hereby incorporated by reference.

INTRODUCTION AND BACKGROUND

This invention relates to a method and system of controlling the value of financial transactions, more particularly on-line transactions involving a token, such as a credit card, debit card and cash card.

It is known that substantial amounts of money may be stolen from a card holder's bank account by an unauthorised party who obtained possession of the a card or details of a card. The risk may to some extent be covered by insurance, but the cost of the insurance has become so expensive that the use of token based payment instruments is limited to low risk customers. To alleviate the problem, relatively high daily, transaction and accumulative transaction limits are currently agreed upon by the cardholder and a financial institution. However, in spite of these limits, all the funds in a user's account and even other linked accounts may be stolen over a period of time and before the unauthorised transactions are discovered.

The applicant is aware of a method of pre-authorizing a single transaction, which is used, for example when an authorised user of a card, checks into a hotel, mainly as protection for the hotel to ensure that the user has sufficient funds available to pay for the service, rather than to control unauthorized use of the card. In this method, on checking in, the hotel determines whether there are sufficient funds available in an account associated with the card to pay for a single transaction, namely accommodation in the hotel and still unknown associated charges. If so, an estimated amount of funds is locked or reserved in the account for that one transaction and for the specified vendor or service provider. The transaction is then performed at an uncertain future time when the user checks out, utilizing at least the reserved funds.

OBJECT OF THE INVENTION

Accordingly, it is an object of the present invention to provide a method and system of controlling the value of on-line transactions involving tokens of the aforementioned kind with which the applicant believes the aforementioned disadvantages may at least be alleviated.

SUMMARY OF THE INVENTION

According to the invention there is provided a method of controlling the value of at least one proposed on-line transaction involving a token associated with an authorised user and which transaction will involve a transfer of funds from an account of the user with a financial institution and which account is associated with the token, the method comprising the steps of:
  prior to the at least one proposed transaction, receiving pre-transaction authorisation data relating to the at least one proposed transaction;
  the authorisation data comprising first time data relating to a time window within which the at least one proposed transaction must take place and first amount data relating to an amount with which a value of the at least one proposed transaction must comply;
  substantially at the time of each of the at least one proposed transaction, receiving proposed transaction data comprising second time data relating to a time instant of said proposed transaction and amount data relating to a value of said proposed transaction;
  comparing the proposed transaction data and the authorisation data; and
  enabling said proposed transaction only if the proposed transaction data complies with the authorisation data.

The at least one proposed transaction may comprise at least two proposed transactions.

Said proposed transaction may be enabled by authorising or causing a transfer of funds in an amount corresponding to the value of said proposed transaction from the account at the financial institution associated with the user.

The method may comprise the step of enabling the user or a third party to transmit at any time prior to the at least one proposed transaction the authorisation data to an authorisation agent or station.

The first time data of the authorisation data may comprise one of data relating to a time when the time window expires; and data relating to a time period relative to a start time of the time window, so that the expiry time may be computed. The start time may be the time of transmission or reception of the authorisation data.

The first amount data of the authorisation data may comprise any one of data relating to a value cap per transaction; and data relating to an accumulative amount for the at least one proposed transaction.

A secure channel may be established to enable the user or third party to transmit the authorisation data to the authorisation station.

The invention also includes within its scope a transaction authorisation system for at least one proposed on-line transaction involving a token associated with an authorised user of the token, the system comprising:
  a central transaction authorisation station;
  a plurality of distributed terminals associated with authorised users of tokens;
  at least one financial institution in data communication with the authorisation station;
  a plurality of vendor stations in data communication with the financial institution;
  the terminals being configured to transmit to the authorisation station a message comprising authorisation data comprising first time data relating to a time window within which the at least one proposed transaction must take place and first amount data relating to an amount with which a value of the at least one proposed transaction must comply;
  each vending station being configured to transmit to the authorisation station, substantially at the time of one of the at least one proposed transaction, transaction data comprising second time data relating to a time instant of said one transaction and second amount data relating to the value of said one transaction; and
  the system being configured to compare the transaction data in real time with the authorisation data and to authorise or cause a transfer of funds from an account associated with the user, only if the transaction data complies with the authorisation data.

The system may comprise a secure data channel between each user terminal and the authorisation station, when the authorisation data is transmitted. The secure channel may be provided by encryption techniques.

The authorisation station may form part of the financial institution and in other embodiments it may comprise a central authorisation service provider station connected to one or more financial institutions.

At least some of the distributed terminals may each comprise a mobile phone and the authorisation data may be transmitted to the authorisation station in the form of a text message utilizing the mobile phone and associated mobile phone infrastructure.

Further included within the scope of the present invention is a transaction authorisation station comprising:
- means for receiving pre-transaction authorisation data comprising first time data relating to a time window within which at least one proposed transaction must take place and first amount data relating to an amount with which a value of the at least one proposed transaction must comply;
- means for receiving from a vendor or service provider station at the time of one of the at least one transactions, transaction data comprising second time data relating to a time instant of said one proposed transaction and second amount data relating to the value of said one proposed transaction;
- comparator means for comparing the authorisation data and the transaction data; and
- means for enabling said one transaction if the transaction data complies with the authorisation data.

BRIEF DESCRIPTION OF THE ACCOMPANYING DIAGRAMS

The invention will now further be described, by way of example only, with reference to the accompanying diagrams wherein FIG. 1 a block diagram illustrating the system according to the invention;

DESCRIPTION OF A PREFERRED EMBODIMENT OF THE INVENTION

Figure 1:
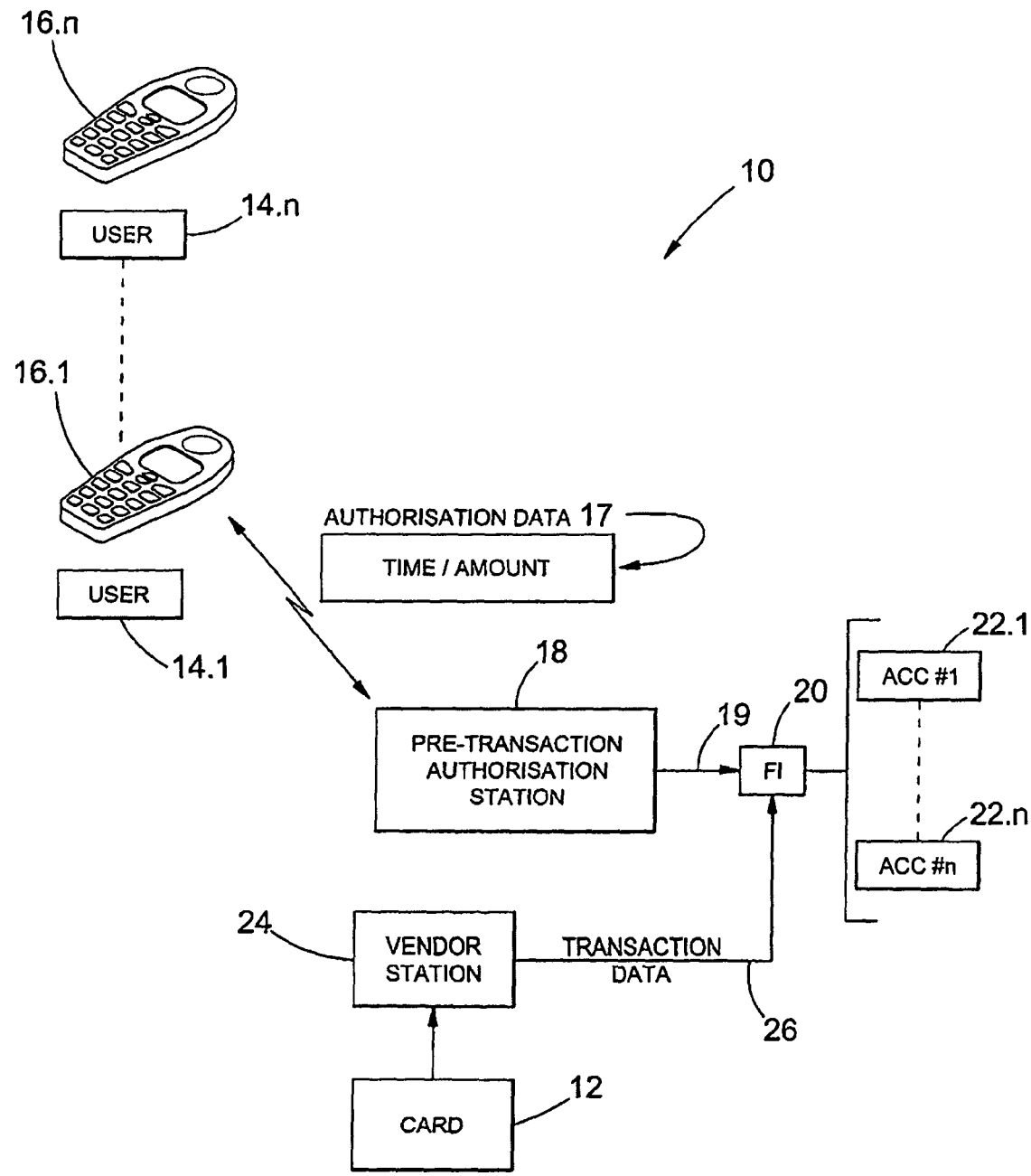

In FIG. 1, a system according to the invention for pre-transaction authorisation of at least one proposed transaction involving a payment token associated with an authorised user of the token is generally designated by the reference numeral 10. The token 12 may be any token for use in transferring funds from an account of an authorised user of the token, such as a debit card, credit card or cash card. The account may be held by any suitable financial institution.

A plurality of authorised users of respective financial transaction tokens are shown at 14.1 to 14.n. Each user is associated with a respective distributed user station comprising a data message transceiving terminal, such as a mobile phone 16.1 to 16.n. The terminals are configured, upon operation by the user, to transmit to a transaction authorisation station 18 of an authorisation agent and via a data link or channel, preferably an encryption secured link 15, a pre-transaction authorisation message comprising authorisation data 17. The transaction authorisation station 18 is connectable to a financial institution 20 via data link 19, or forms part of the financial institution 20. The financial institution comprises a computerized accounts system comprising respective accounts 22.1 to 22.n for the users 16.1 to 16.n, and the aforementioned tokens are associated with these accounts in known manner.

A plurality of vendor or service provider stations, only one of which is shown at 24, are also connected in known manner to the financial institution, to be in data communication with the financial institution 20 via a link 26.

The aforementioned pre-transaction authorisation data 17 comprises first time data relating to a time window having a start time and an expiry time within which the at least one proposed authorised transaction must take place and first amount data relating to a value with which the value of the at least one proposed transaction must comply. When prepared on a mobile phone 16.1 to be sent by way of a text message, the following command set may be available to compose the authorisation data:

Command|=<Type> <Value> <Timer>
Type=<{none for accumulative}|T{transaction}|C {capped}>
Value|={number value}
Timer|<Timer type> <Time value>
Timer type|=<+{relative}|#{exact time}>
Time value|=[[[<Month>:]<Day>:]<Hours>:]]<Minutes>

For example:
"300+30"→accumulative up to $300 for the next 30 minutes.
"T300+1:30"→A single transaction to the maximum of $300 for the next hour and 30 minutes.
"C30+2:1:30"→Capped to $30 for the next 2 days, one hour and 30 minutes.
"300#10:23:12:30→$300 accumulative till 12:30 on 23 October of this year.
"300#23:12:30→$300 accumulative till 12:30 on 23 of this month of this year.

The standard keys on a mobile phone may be used to enter these messages and data. A similar simple structure could be used for World Wide Web or Internet based terminals.

The authorisation data is received and processed at the pre-transaction authorisation station 18 and, if necessary, the processed data is made available to the computer system of the financial institution to control the proposed transactions and to reduce potential theft or fraud, as hereinafter described.

Figure 3:
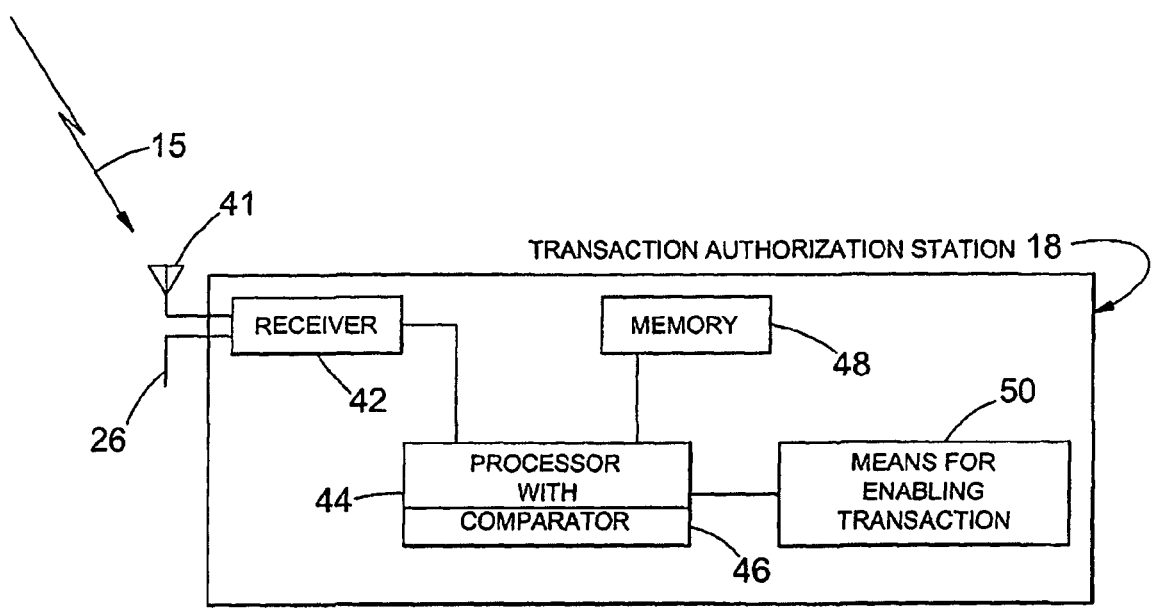
FIG. 3 is a block diagram of a transaction authorisation station forming part of the system.

A block diagram of one example embodiment of the transaction authorization station 18 is shown in FIG. 3. The station comprises means 41, 42 for receiving the pre-transaction authorisation data and means 26, 42 for receiving transaction data. The station 18 further comprises a processor 44 with data comparator means 46, a memory arrangement 48 and means 50 for enabling a transaction, as will hereinafter be described in more detail.

Figure 2:
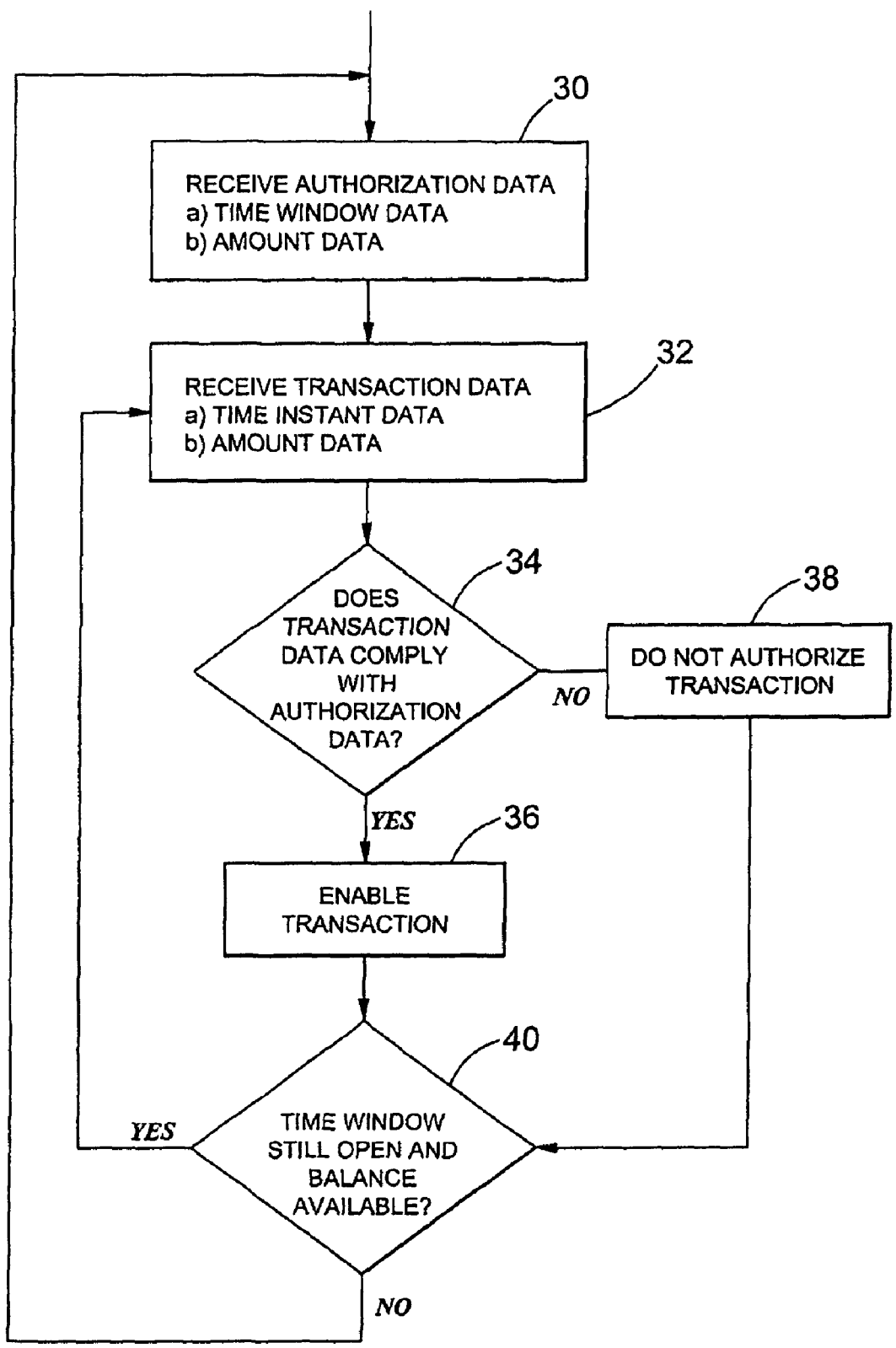
FIG. 2 is a flow diagram of the method according to the invention.

It is well know that the use of credit cards for internet payments 20 presents a risk. It is believed that the system and method according to the invention would reduce that risk as follows. Referring to FIGS. 1 and 2, at a user station or from the terminal 16.1, the card holder 14.1 determines the value of the at least one proposed transaction and sends a pre-transaction authorisation message comprising authorisation data comprising first time data relating to a time window within which the at least one transaction must take place and first amount data relating to the value of the at least one proposed transaction to the station 18. This authorisation data is received at 30 shown in FIG. 2 at the authorisation station 18. The credit card details are made available to the vendor. The vendor then starts processing the proposed transaction within the time window for the amount specified.

Transaction data comprising second time data relating to the time instant of processing and second amount data relating to the value of the proposed transaction is electronically transmitted to the authorisation station or financial institution where it is received as shown at 32 in FIG. 2. The system 10 is configured to compare in real time the authorisation data and the transaction data. More particularly, the authorisation data and the transaction data are compared at 34, by means 46 (shown in FIG. 3) for comparing the data, and if the transaction data complies with the authorisation data, a funds transfer from the account of the user to the account of the vendor or service provider is authorised in real time and performed at 36 (shown in FIG. 2) in known manner. However, should the card number be used improperly, that is after the time window has expired or for an unauthorised amount, the transaction will not be performed as shown at 38 and a flag will be raised. As shown at 40, once the time window has expired, a new pre-transaction authorisation message is required to enable further use of the token.

The generic flow diagram in FIG. 2 is also applicable to the following embodiment. Should a cardholder go on a shopping excursion, he/she could beforehand limit the amount to be spent by means of the card during the excursion. This facility could also be utilized by a third party, such as a parent, to control or limit the funds to be spent by a card holding child/minor. For example, a minor may hold a card associated with an account with a balance of $1000. The parent may want to limit the expenditure for entertainment during one evening to say $200. By using a pre-transaction authorisation message with first time data relating to a time window corresponding the evening's outing and first amount data relating to an accumulative amount of $200, the minor is prevented from spending more than $200 during the evening. Furthermore, should the card be lost, another party will not be able to spend any additional funds after the expiry of the time window. However, the minor will be free to spend an amount up to $200 in any number of transactions at any vendor or service provider of his/her choice.

Improper use of company credit cards may similarly be prevented by a financial officer of the company, who will be responsible to send the pre-transaction authorisation data to the authorisation agent.

Cash card theft or "gun point forced transactions" at auto tellers may also be controlled with the system and method according to the invention. For example, before arriving at an auto teller to withdraw cash using the card, the cardholder sends as aforesaid via mobile phone 16.1 an authorisation message comprising first time data relating to a time window for the withdrawal and first amount data relating to the amount to be withdrawn by him. At the auto teller, the cardholder would then be able to withdraw the amount specified during the time window specified. Should the card be stolen or used without authority during and after expiry of the time window, the maximum amount that would be lost is limited to the authorised amount.

An amount corresponding to the amount data in the authorisation data may be added to a user pre-selected base amount, which base amount would be a default amount available for all transactions. The base amount may be selected to be 0$, alternatively any other suitable amount agreed upon by the user and financial institution.

The following examples and tables will illustrate the invention further. The following table illustrates the time limited pre-authorisation with real values (note that the base value is zero, thus only the authorised value can be withdrawn from the account):

| Time | Action | Value Authorised | Balance |
|---|---|---|---|
| Single transaction ||||
| 08:00 | | $ 0 | $10,000 |
| 08:11 | TP-Auth $400 for a single transaction for 15 minutes | $400 | $10,000 |
| 08:14 | Transact $321 | $ 0 | $ 9,679 |
| 08:26 | Time-out | $ 0 | $ 9,679 |
| Capped ||||
| 08:00 | | $ 0 | $10,000 |
| 08:11 | TP-Auth $50 for capped transactions for 30 minutes | $ 50 | $10,000 |
| 08:14 | Transact $21 | $ 50 | $ 9,979 |
| 08:20 | Transact $41 | $ 50 | $ 9,938 |
| 08:31 | Transact $34 | $ 50 | $ 9,904 |
| 08:41 | Time-out | $ 0 | $ 9,904 |
| Accumulative ||||
| 08:00 | | $ 0 | $10,000 |
| 08:11 | TP-Auth $500 for accumulative transactions for 30 minutes | $500 | $10,000 |
| 08:14 | Transact $121 | $379 | $ 9,879 |
| 08:20 | Transact $241 | $138 | $ 9,638 |
| 08:31 | Transact $134 | $ 4 | $ 9,504 |
| 08:41 | Time-out | $ 0 | $ 9,504 |

There is also provided software embodied in one or more computer readable medium and when executed operable to perform the method as herein defined and/or described.

It will be appreciated that the at least one proposed transaction may comprise any number of transactions. Preferably it comprises at least two transactions, preferably sequential transactions. The vendors may be known or unknown and are typically not specified in the pre-transaction authorisation message. The authorisation station 18 may at least partially be operated by an independent authorisation agent, alternatively it may be incorporated or integrated in the computer system of the financial institution.

The invention claimed is:

1. A method of controlling the value of at least one proposed on-line transaction involving a token associated with an authorised user and which transaction will involve a transfer of funds from an account of the user with a financial institution and which account is associated with the token, the method using a transaction authorisation system comprised of a terminal associated with the user and a transaction authorization station, the method comprising the steps of:

enabling the user to select, by means of the terminal associated with the user, a base amount available from the user's account for future transactions, to thereby establish a maximum amount that the user may lose due to unauthorized use of the token;

enabling the user to transmit, by means of the associated terminal, at any time prior to at least one proposed transaction a data message comprising pre-transaction authorization data relating to the at least one proposed transaction to the transaction authorization station;

prior to the at least one proposed transaction, receiving at the transaction authorization station pre-transaction authorisation data relating to the at least one proposed transaction;

the pre-transaction authorisation data comprising first time data relating to a time window within which the at least one proposed transaction must take place and first amount data relating to an amount, which is different from the base amount, and with which a value of the at least one proposed transaction must comply;

at the time of each of the at least one proposed transaction, receiving at the transaction authorization station proposed transaction data comprising second time data relating to a time instant of said proposed transaction and amount data relating to a value of said proposed transaction;

comparing at the transaction authorization station the proposed pre-transaction transaction data and the authorisation data;

enabling said proposed transaction only if the proposed transaction data complies with the pre-transaction authorisation data; and at the end of the time window, automatically resetting the first amount data to the base amount.

2. A method as claimed in claim 1 wherein the at least one proposed transaction comprises at least two proposed transactions.

3. A method as claimed in claim 1, wherein said proposed transaction is enabled by authorizing a transfer of funds in an amount corresponding to the value of said proposed transaction from the account at the financial institution associated with the user.

4. A method as claimed in claim 1, wherein the base amount is zero.

5. The method as claimed in claim 1, wherein the first time data of the authorisation data comprises one of data relating to a time when the time window expires and data relating to a time period relative to a start time of the time window.

6. The method as claimed in claim 1, wherein the first amount data of the authorisation data comprises any one of data relating to a value cap per transaction; and data relating to an accumulative amount for the at least one proposed transaction.

7. The method as claimed in claim 4, wherein a secure channel is established to enable the user to transmit the authorisation data to the authorisation station.

8. A transaction authorisation system for at least one proposed on-line transaction involving a token associated with an authorized user of the token, the system comprising:

a central transaction authorisation station configured to store a user selected base amount available from the user's account for future transactions, to thereby establish a maximum amount that the user may lose due to an unauthorized use of the token;

a plurality of distributed terminals associated with authorized users of tokens;

at least one financial institution in data communication with the authorisation station;

a plurality of vendor stations in data communication with the financial institution;

the terminals being configured to transmit to the authorisation station a message comprising authorization data comprising first time data relating to a time window within which the at least one proposed transaction must take place and first amount data relating to an amount, different from the base amount, and with which a value of the at least one proposed transaction must comply;

each vending station being configured to transmit to the authorisation station, at the time of one of the at least one proposed transaction, transaction data comprising second time data relating to a time instant of said one proposed transaction and second amount data relating to the value of said one proposed transaction; and the system being configured to compare the transaction data in real time with the authorization data and to authorize a transfer of funds from an account associated with the user, only if the transaction data complies with the authorization data; and the system being configured, at the end of the time window, automatically to reset the first amount data to the base amount.

9. The system as claimed in claim 8 comprising a secure data channel between each user terminal and the authorization station, when the authorisation data is transmitted.

10. The system as claimed in claim 8, wherein at least some of the distributed terminals each comprises a mobile phone and wherein the authorisation data is transmitted to the authorisation station in the form of a text message utilizing the mobile phone.

11. A transaction authorisation station comprising:

means for establishing a base amount available for future transactions involving a financial account of a user, to thereby establish a maximum amount that the user may lose due to an unauthorized use of a payment token associated with the user for a transaction which will result in a transfer of funds from the user's financial account;

means for receiving pre-transaction authorisation data comprising first time data relating to a time window within which at least one proposed transaction must take place and first amount data relating to an amount different from the base amount, and with which a value of the at least one proposed transaction must comply;

means for receiving from a vendor or service provider station at the time of one of the at least one transactions, transaction data comprising second time data relating to a time instant of said one proposed transaction and second amount data relating to the value of said one proposed transaction;

comparator means for comparing the authorisation data and the pre-transaction transaction data; and means for enabling the said one transaction if the transaction data complies with the pre-transaction authorisation data; and the authorization station being configured, at the end of the time window, automatically to reset the first amount data to the base amount.

* * * * *